Dec. 5, 1944.  H. F. KOHLER  2,364,451
CHEMICAL PROCESS
Filed Dec. 11, 1941
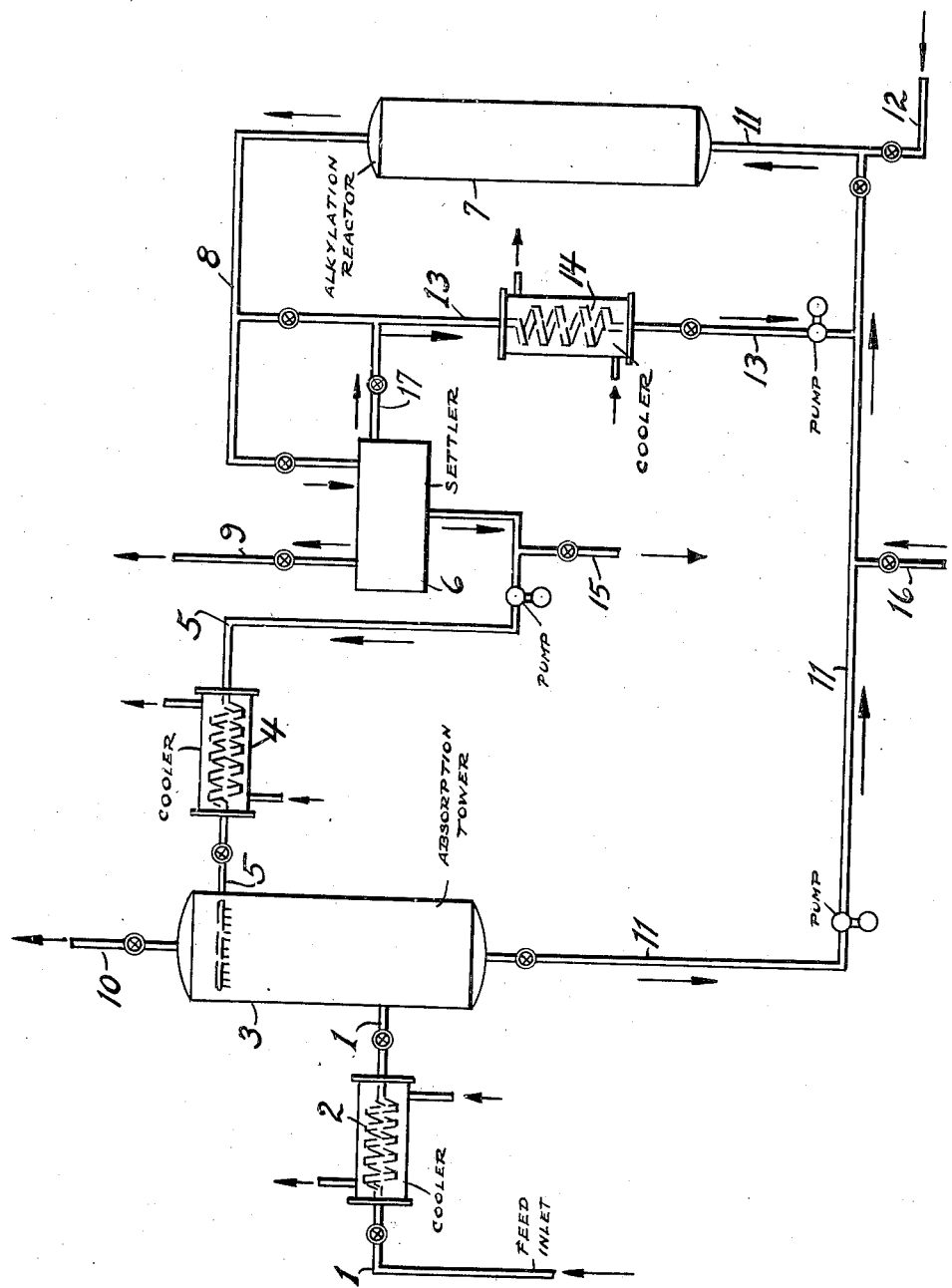
Henry F. Kohler Inventor
By P. L. Young Attorney Patented Dec. 5, 1944

2,364,451

UNITED STATES PATENT OFFICE 2,364,451

CHEMICAL PROCESS

Henry F. Kohler, Baytown, Tex., assignor to Standard Oil Development Company, a corporation of Delaware Application December 11, 1941, Serial No. 422,490

13 Claims. (Cl. 260—683.4)

The present invention relates to improvements in the synthesis of hydrocarbons of relatively lower molecular weight to hydrocarbons of relatively higher molecular weight by alkylating an isoparaffin with an olefin in the presence of concentrated sulfuric acid. More specifically, and in perhaps its preferred and most useful modification, my invention relates to the alkylation of normally gaseous isoparaffins with normally gaseous olefins to produce hydrocarbons boiling within the gasoline range.

Prior to my invention others had alkylated isoparaffins with olefins in a continuous process in the presence of concentrated sulfuric acid, that is to say, sulfuric acid having a concentration from 90 to 98% by weight, to produce hydrocarbons boiling within the gasoline range and having an improved octane rating. However, the prior processes of which I am aware are subject to numerous objections, since the alkylation of normally gaseous isoparaffins with olefins is a relatively recent development in the petroleum industry.

The alkylation process is ordinarily carried out by mixing an olefin-containing stock with an isoparaffin-rich stock and charging the mixture to a reactor in which suitable conditions of temperature, time of contact, acid strength, isoparaffin-olefin ratio, etc. are maintained. This is usually called the one-stage process. As it is advantageous to have a high isoparaffin-olefin ratio in the reactor, it is necessary to recover the excess isoparaffin in the hydrocarbon mixture leaving the reactor by suitable fractional distillation. The olefin-containing stocks available usually contain considerable amounts of normal paraffin hydrocarbons. These normal paraffins are undesirable for several reasons, the main objection being that the normal paraffins must be separated from excess isoparaffins by distillation, and hence large amounts of normal paraffins increase the necessary distillation equipment and the resulting operating cost. Another objection is that the normal paraffins act as diluents in the alkylation reactor and reduce the concentration of the isoparaffin, thereby impairing the quality of the alkylate. The normal paraffins in the olefin-containing feed stock can be substantially kept out of the alkylation reactor and product distillation equipment by using the so-called two-stage alkylation operation. In this process the olefin-containing stock is first charged to an absorber with concentrated sulfuric acid where the olefins are absorbed and the resulting acid-olefin extract separated from the remaining hydrocarbons. The extract is then charged with an isoparaffin-rich stock to a reactor where suitable alkylation conditions are maintained. It is readily seen that the two-stage process has the advantage over the one-stage process in that the normal paraffins are removed in the first stage and therefore kept out of the alkylation reactor and product distillation equipment. As concentrated sulfuric acid has a strong polymerizing and oxidizing action on the absorbed olefins, it is very important to use proper conditions in the absorption stage, especially in regard to the molal acid-olefin ratio. It has been found that when absorbing normal butylenes in the liquid phase in 90-98% sulfuric acid considerable amounts of dialkyl sulfates are formed if the molal acid-olefin ratio is 1:1 or lower. This is undesirable as part of the dialkyl sulfates will be carried out of the absorber in solution in the saturated hydrocarbons. This will involve an additional distillation to separate the dialkyl sulfates. If slightly higher acid-olefin ratios are used, say 1.5:1 or 2:1, considerable amounts of polymer will be formed, which is also undesirable as the polymer is less valuable than the alkylated product obtained in the alkylation reactor.

My invention resides in the first stage of the above indicated process, namely, in the absorption stage, for thereafter I proceed according to conventional methods. The gist of my invention resides in the concept of employing in the absorption stage of this two-stage alkylation process a large molal excess of sulfuric acid with respect to the olefin content of the feed stock to the absorption zone so that, in accordance with the known law of mass action, I produce in the absorption zone a large preponderance of monoalkyl sulfate and a minimum amount of dialkyl sulfate. Furthermore, another advantage of using a large excess of concentrated sulfuric acid is to minimize the tendency of the olefin content of the charging stock to form polymers. This is apparently contradictory to the earlier statement that the polymer formation increases when the molal acid-olefin ratio increases from 1:1 to 2:1. However, it was unexpectedly found that when very high molal acid-olefin ratios were used, the polymer formation decreased as the acid-olefin ratio increased.

It is also pointed out, although this particular factor is not the essential part of my invention that the feed stock to the absorption phase or zone should be substantially free of isoolefin or tertiary olefin, since it has been found that these olefins give very poor alkylation products. For example, suppose that isobutylene and normal butylene were present in the charging stock to the absorption zone, there is some tendency to form di-isobutylene or a copolymer containing the reaction product between isobutylene and normal butylene. This product is undesirable for the following reasons: (1) It is unsaturated and has a relatively lower octane number than the product obtained by alkylating an isoparaffin with an olefin, and (2) the di-isobutylene or the copolymer of isobutylene and normal butylene has a tendency to dissolve in the liquefied normal paraffins of the charging stock to the absorption zone, and consequently decrease the final yield of desirable alkylate to the extent that it is dissolved in the said liquefied normal paraffins withdrawn from the absorption tower.

The statement made in the preceding paragraph, of course, applies generally to two-stage alkylation and is critical with respect to the present invention.

One object of the present invention is to carry out a two-stage alkylation process, that is to say, a process of alkylating isopraffins, either normally gaseous or normally liquid, with a normally gaseous or normally liquid olefin, in the first stage of which the olefin is absorbed in concentrated sulfuric acid having a strength of from 90 to 98%, and in the second, or alkylation, stage proper, to effect the alkylation of isoparaffin with the alkyl sulfates produced in the first stage. As stated before, the present invention resides in the concept of employing in the first stage a large excess of sulfuric acid, namely, from 25 mols of sulfuric acid to 1 mol of olefin to 200 mols of sulfuric acid to 1 mol of olefin, and preferably I employ a ratio within the range of from 50 to 100 mols of sulfuric acid per mol of olefin. I also prefer to operate in the temperature range during the absorption stage of from 0° to 75° F., depending on the olefin used, with a preferred absorption temperature range of from about 25° to 35° F.

My invention will be best understood by reference to specific examples and, in order to aid in the understanding of the specific modification which I am about to disclose, reference is made to the accompanying drawing which shows diagrammatically a flow plan illustrating a preferred modification of carrying my invention into practical effect.

Referring in detail to the drawing, I represents the inlet to the system of a liquefied olefin-containing feed stock containing 8 to 20% of normal olefin, such as normal butylene, the remainder being paraffins and isoparaffins, the isoolefin content being preferably not more than 0.5% by weight for the reasons previously indicated. This charging stock is fed through cooler 2 into an elongated absorption tower 3 where it contacts sulfuric acid having a concentration of over 90% by weight, and preferably as high as 98% by weight, the said acid being discharged into the absorption tower through cooler 4 in line 5. Coolers 2 and 4 may be refrigerated by any suitable method and are operated at such temperatures that the reactants in absorption tower 3 are maintained in the temperature range between 0° and 75° F., and preferably in the range from about 25° to 35° F. The acid introduced through line 5 into absorption zone 3 is pumped from alkylation product settler 6 wherein the sulfuric acid catalyst, the alkylation product, and unreacted hydrocarbons withdrawn from alkylation zone 7 through line 8 are settled and separated, the alkylation product and unreacted hydrocarbons being withdrawn through line 9 for separation and recovery by methods familiar to those skilled in the alkylation art.

It is again pointed out that the novelty in my invention resides in the concept of so proportioning the molal ratio of acid to olefin in the feed stock that the said olefin is, as indicated, in the ratio of from 25 to 200 mols of acid per mol of olefin, with a preferred range of from 50 to 100 mols of acid per mol of olefin. I have found that when proceeding in this manner the major portion, if not all, of the olefin reacts with the sulfuric acid in the absorption phase to form monoalkyl sulfate, with minor amounts of dialkyl sulfate. This phase of my invention is important because the dialkyl sulfate is relatively more soluble in the liquefied paraffin contained in the absorption zone than in the sulfuric acid, while the monoalkyl sulfate is relatively insoluble in the paraffin hydrocarbon. Therefore, when the liquefied paraffin is withdrawn from the absorption zone 3 by means of line 10, it contains a much less quantity of olefin in combined form, under conditions I have specified hereinbefore, than in the procedure where substantially 1 mol of sulfuric acid is contacted in the absorption zone with 1 mol of olefin in the charging stock to the said absorption zone. The extract, comprising substantially all of the olefin charged to the absorption zone, in the form of monoalkyl sulfate is withdrawn from the absorption zone 3 through line 11 and charged into alkylation reactor 7, together with an isoparaffin introduced into the system through line 12, as shown in the drawing. The alkylation is carried out in alkylation zone 7 under normal conditions of temperature, pressure, and time of contact and this alkylation stage, per se, does not form a part of my present invention.

As is well known to persons skilled in the alkylation art, it is extremely important that a high concentration of isoparaffins should be maintained in the alkylation zone in order that maximum yields of highest quality product may be obtained. This fact is equally true in carrying out one of the objects of my invention. I attain this result by feeding enough isoparaffin through line 12 so as to maintain an isoparaffin mol percentage in the reactor hydrocarbon of at least 60%. I may also achieve a high isoparaffin-olefin ratio in the reactor zone by recycling acid-hydrocarbon emulsion withdrawn from line 8 through line 13 and cooler 14 and reintroducing into the reaction zone through line 11.

It is generally desirable to maintain a volume ratio of about one part acid to one part of hydrocarbon in reactor 7 and, accordingly, the portion of acid-hydrocarbon emulsion entering settler 6 through line 8 is in this ratio. Since the quantity of hydrocarbon in the system would be thrown out of balance if a greater quantity thereof were withdrawn through line 9 than is introduced as olefin in line 1 and as extraneous hydrocarbons through line 12, I maintain the desired balance between hydrocarbons withdrawn and acid fed to absorber 3 by recycling a major portion of the settled hydrocarbons from settler 6 to reactor 7 through lines 17, 13 and 11. This recycled hydrocarbon further assists in maintaining a high isoparaffin concentration in the alkylation zone.

Since, during the alkylation reaction, the acid catalyst gradually becomes contaminated with complex organic material and water, it is generally desirable to discard through line 15 a very small proportion of the acid flowing in line 5 and to replace this discarded acid by fresh, strong acid (preferably 98% by weight) through line 16 connecting with line 11. Only sufficient acid is replaced in this manner so that the optimum strength is maintained in the alkylation zone.

In order to show the utility of my present invention, the following three runs which I have made are set forth below. In these runs, isobutane was used as the isoparaffin, and the olefinic feed stock had the following composition by volume: 18.5% normal butylene, 0.1% isobutylene, 2.0% propane, 19.7% isobutane, and 59.7% normal butane.

| | | | |
|---|---|---|---|
| Acid-olefin mol ratio in absorber | 119 | 49 | 24 |
| Isobutane concentration in reactor hydrocarbon mol per cent | 81 | 82 | 76 |
| Absorber temp °F | 28 | 27 | 37 |
| Reactor temp °F | 33 | 33 | 36 |
| Acid strength percent | 92.5 | 93.5 | 92.5 |
| Time of contact in reactor minutes | 118 | 106 | 90 |
| Acid-hydrocarbon vol., ratio in reactor | 0.79 | 0.89 | 1.13 |
| Alkylate yield, wt. per cent of butylene | 175 | 146 | 143 |
| Aviation fraction in alkylate vol. per cent | 94 | 89 | 72 |
| Octane No. of aviation fraction, A. S. T. M. | 95 | 94 | 94 |
| Polymer, wt. per cent of butylene absorbed | 3.8 | 4.9 | 6.9 |

In the foregoing examples it will be noted that when the acid to olefin ratio was 119 mols of acid to one of olefin in the feed stock, the total alkylate contained 94% of aviation fraction having an A. S. T. M. octane number of 95, and the polymer formed was only 3.8%. On the other hand, when the acid to olefin ratio was 49 mols of acid to one mol of olefin, the total alkylate contained 89% of aviation fraction having an octane number of 94, and the polymer was 4.9%. In the third run when the acid to olefin ratio was 24 to 1, the alkylated product contained only 72% of aviation alkylate having 94 octane number, and there was formed 6.9% of polymer. These data show that when a large excess of acid to olefin was employed in the absorption zone, the yields of aviation fraction were larger, the octane number greater, and the amount of polymer formed was less.

It has been shown from the foregoing specific examples that a definite improvement in the two-stage alkylation of isoparaffins with olefins may be secured by employing in the first stage thereof a large excess of acid to olefin. As heretofore explained when operating in this manner, the quantity of monoalkyl sulfate formed is greater, which means that the formation of dialkyl sulfate capable of dissolving in the liquefied paraffin is less, so that the over all yield from a given amount of olefin and a given feed stock, is greater. It has also been shown by the data that the amount of undesirable polymers formed when proceeding in the manner indicated in the present invention, is substantially less than that obtained when lower acid to olefin ratios are employed.

Although I have illustrated in the preceding specific examples the alkylation of isobutane with normal butylene, it is to be distinctly understood that the same results may be secured with any normally gaseous or normally liquid isoparaffin and/or normally gaseous or normally liquid normal olefin.

Many modifications of my invention, or falling within the spirit thereof, will suggest themselves to those familiar with this particular art.

What I claim is:

1. A process for the preparation of mono-alkyl sulfates suitable for subsequent alkylation with isoparaffins comprising contacting olefins with concentrated sulfuric acid, the molal ratio of which is from 25-200 mols per mol of olefin.

2. A process for the preparation of mono-alkyl sulfates suitable for subsequent alkylation with isoparaffins comprising contacting olefins with concentrated sulfuric acid, the molal ratio of which is from 50-100 mols per mol of olefin.

3. The process set forth in claim 1 in which the temperature is from 0-75° F.

4. The process set forth in claim 2 in which the temperature is from 0-75° F.

5. The process set forth in claim 1 in which the olefins are in the liquid phase.

6. The process set forth in claim 2 in which the olefins are in the liquid phase.

7. The process set forth in claim 1 in which the reaction between olefins and acid takes place in the substantial absence of iso-olefins.

8. The process set forth in claim 2 in which the reaction between olefins and acid takes place in the substantial absence of iso-olefins.

9. A process for the preparation of monobutyl sulfates suitable for the subsequent alkylation with isoparaffins comprising contacting normal butylene with concentrated sulfuric acid, the molal ratio of which is from 25-200 mols of acid per mol of normal butylene.

10. The process set forth in claim 9 in which the olefins contacted with the sulfuric acid are in the liquid phase.

11. The process set forth in claim 9 in which the ratio of acid to olefin is from 50-100 mols of acid per mol of olefin.

12. The process set forth in claim 9 in which the temperature is between 0-75° F.

13. The process set forth in claim 9 in which the normal butylene is reacted with sulfuric acid in the substantial absence of isobutylene.

HENRY F. KOEHLER.